Sept. 19, 1939.  F. J. LAPOINTE  2,173,396
BROACHING MACHINE
Filed March 29, 1937   2 Sheets-Sheet 1
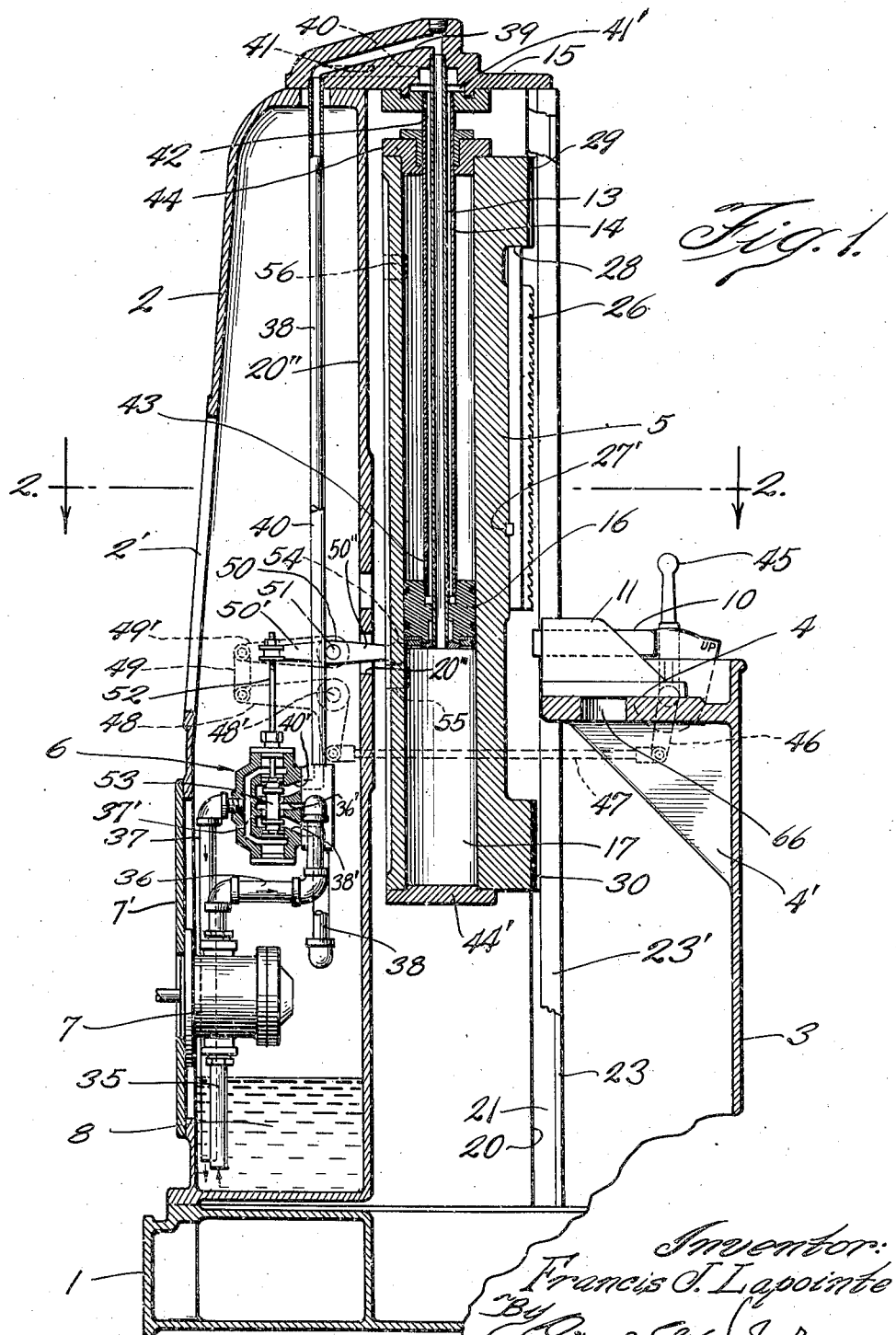

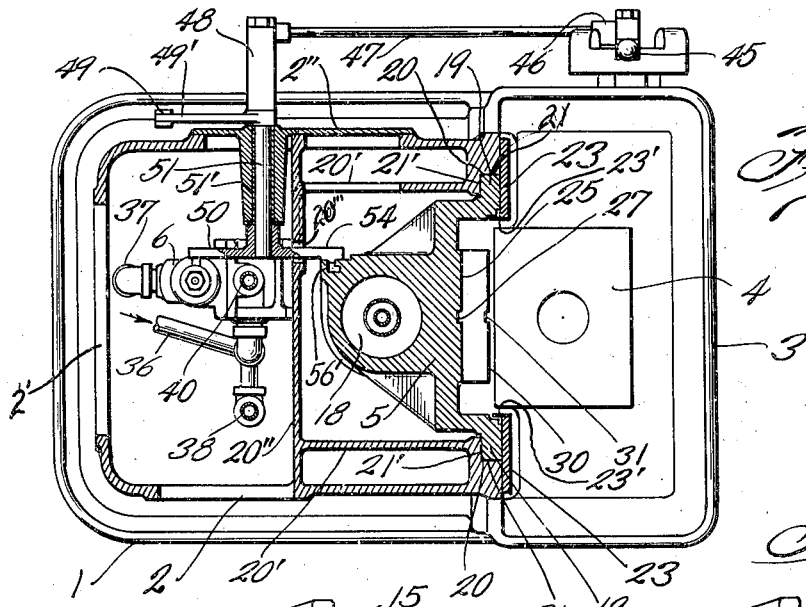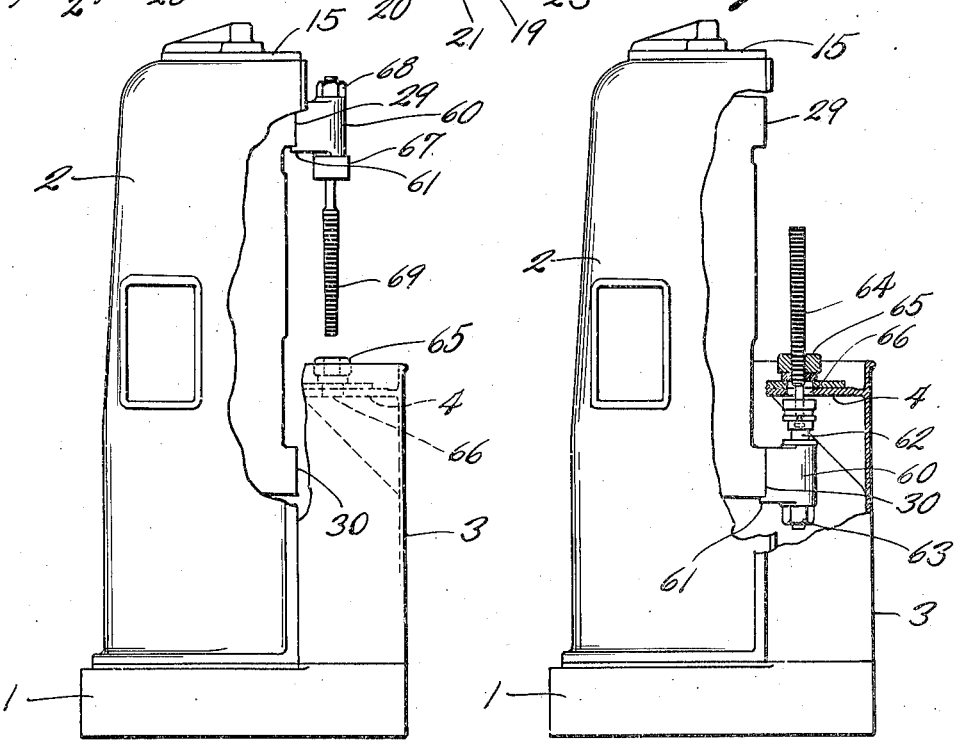

Patented Sept. 19, 1939

2,173,396

UNITED STATES PATENT OFFICE 2,173,396

BROACHING MACHINE

Francis J. Lapointe, Ann Arbor, Mich., assignor to Sundstrand Machine Tool Co., Rockford, Ill., a corporation of Illinois Application March 29, 1937, Serial No. 133,538

23 Claims. (Cl. 90—33)

My invention relates to broaching machines and especially to a hydraulically actuated universal broaching machine.

A primary object of the invention is the provision of a universal broaching machine capable of performing with equal efficiency all types of broaching operations, such as push broaching, pull broaching, and surface broaching, as well as miscellaneous operations which are at times performed on the certain types of broaching machines.

A more particular object of the invention is to provide a universal broaching machine having the simplicity and accuracy of operation of a single purpose machine but so constructed that it has the numerous advantages of a general purpose machine in that it permits of convenient and rapid set-up, by means of which it can be changed over from one type of broaching operation to another, without the necessity of rebuilding or rearranging the operating parts of the machine, or may even perform a plurality of broaching or other operations at the same time.

Another object is the provision of a new and improved broaching machine of rugged and compact construction having a carriage for supporting broaching tools which is of novel construction and mounting for reciprocation in a manner calculated to produce the most precise results, regardless of the type of broaching for which the machine is set up.

Still another object is the provision of a universal broaching machine having a single moving broach carriage to which fixtures can be attached to accommodate different types of broaches and which is so arranged that the power stroke is always in the same direction regardless of the particular type of broaching operation required.

It is still another object to provide a new and improved all-purpose broaching machine wherein the work is always accommodated at the same relative position on the machine irrespective of the particular type of broaching operation which is being performed, thus making possible a permanent set up so that fixtures, conveyors and other auxiliary conveniences of operation need not be altered or removed when the machine is changed over from one type of broaching operation to another.

A further object is the provision of a new and improved universal broaching machine in which provision is made for the accurate and braced alignment of cross-heads or other manner of tool supports when attached to the machine, so that operations performed by the machine will have a high standard of precision.

Still a further object is to provide a universal hydraulic broaching machine having a stationary work support and a vertically disposed piston and cylinder device, the piston of which is stationary and the cylinder of which is vertically reciprocable past the work support and is guided throughout its length and throughout its movements in ways formed on the machine so as to have an accurate and precise movement, the cylinder constituting a broach carriage and being formed at its upper and lower ends respectively for the rigid attachment of a crosshead securing a push broach or a pull broach and formed intermediate its ends for the rigid attachment of a surface broach.

It will be seen that a broaching machine constructed in accordance with my invention can be readily adapted for push broaching, pull broaching, or surface broaching operations. With the cylinder forming the broach supporting carriage and rigidly guided throughout its length and throughout its movements in the frame of the machine, the machine is unusually well adapted for the performance of surface broaching operations, because the rigid backing provided by such a carriage for the surface broach results in extremely precise operation and eliminates the inaccuracy introduced by yielding of the broaching tool due to yielding of its support. Furthermore, improved operation is also obtained in the other broaching operations, particularly push broaching, because the carriage cannot possibly yield or be distorted at the end of the broaching stroke as is the case where the cylinder is stationary and the tool is carried by a ram projecting from the cylinder. Moreover, a material reduction in over-all height of the machine is effected as a result of the provision of the movable cylinder. With a machine of this nature, the broaching stroke regardless of the nature of the broaching operation is always in the same direction, which means that the work support need not be mounted for convenient relocation but may be stationarily mounted. Thus, with the work support stationarily mounted, the construction and design of auxiliary equipment, such as conveyors and the like, for assisting in the handling of the work pieces is materially simplified, and this auxiliary equipment, moreover, may also be permanently located.

Further objects and advantages of my invention will become apparent from the following detailed description taken in connection with the accompanying drawings which form a part of this specification.

In the drawings:

Fig. 1 is a vertical longitudinal section of a broaching machine embodying the features of the invention.

Fig. 2 is a cross section on the line 2—2 of Fig. 1 looking in the direction of the arrows with the broach and work piece removed.

Fig. 3 is a side elevational view, partially in section, of the machine shown in Fig. 1 with a broaching attachment and tool set up for pull broaching.

Fig. 4 is a side elevational view, partially in section, of the broaching machine shown in Fig. 1 set up for push broaching.

While the invention is susceptible of various modifications and alternative constructions, it is here shown and will be described hereinafter in a preferred embodiment, but it is not intended that the invention is thereby to be limited to the specific construction disclosed but it is intended to cover all modifications and alternative constructions falling within the spirit and scope of the invention as defined by the appended claims.

In the drawings, the broaching machine illustrated for purposes of disclosure is of the vertical type though the invention is equally well adapted to a horizontal or other type of machine. As shown, the broaching machine comprises generally a hollow frame consisting of a rectangular base 1, a tall column 2 secured on and upstanding from the rear of the base, and a bed 3 upstanding from the front of the base and rising to a height approximately midway of the column 2. Formed integral with the bed near the top thereof and extending inwardly is a work support 4, preferably made rigid by brackets 4', while slidably mounted on the front of the column 2 for vertical reciprocatory movement past the work support 4 is a tool carriage generally designated 5. The carriage is driven through a working and a return stroke by suitable mechanism housed within the upright column. The control of the machine as here shown is semi-automatic in character with the working stroke of the carriage initiated manually under the control of the operator of the machine, while reversal at the end of the working stroke and arrest of the carriage at the end of the return stroke are effected automatically.

The machine is designed and constructed with a view to perfecting a universal machine capable of performing all types of broaching operations. To that end, the carriage 5 is adapted to receive all types of broaching tools, is given a movement with respect to the work support such that all types of broaching operations may be performed, and above all is given a rigid construction and mounting to assure precision in all broaching operations. Accordingly, the carriage 5 is made rectangular and is mounted on the column with its longitudinal axis vertically disposed. The carriage is formed throughout its longitudinal side edges with heavy, laterally projecting guide flanges 19, which cooperate with guideways 20 formed by surfaces 21 and 21' disposed at right angles with one another and extending the full height of the column 2. The surfaces 21' which withstand the major portion of the strain, particularly during a surface broaching operation, are reenforced by webs 20' extending rearwardly to a dividing and reenforcing wall 20'' in the column 2. Plates 23 bolted or secured in some other suitable manner to the front of the column 2 retain the flanges 19 in sliding engagement with the guideways 20. Shielding strips 23' overlie the inner edges of the plates 23 to prevent the entry of dirt and chips. It is to be noted that the carriage 5 occupies a space within the column 2 which is well over half the height thereof, from which it will be seen that the carriage has a large supporting surface which alone is assurance of accurate and precise operation. Moreover, the carriage is always supported throughout its entire length and throughout its entire movements, assuring an equal and a high degree of precision for all operations by eliminating all possibility that the carriage or its mounting will yield at any point in the movement of the carriage.

As previously stated, the carriage is adapted to receive all types of broaching tools in order that the machine may be employed as a universal machine performing all broaching operations. Broaching tools and broaching operations may generally be classified as of three types, namely, push broaching, pull broaching, and surface broaching; push and pull broaching normally being internal operations while surface broaching is an external operation. The carriage 5 accordingly is provided on its front face with a surface 25 intermediate its ends, but slightly nearer the top, for the attachment of a surface broach, a surface 29 at its upper end for the attachment of a push broach, and a surface 30 at its lower end for the attachment of a pull broach. As best seen in Figs. 1 and 2, the surface 25 is formed with a longitudinally extending groove 27 and a transverse groove 27' for the reception of a rib or key aiding in the aligning and securing of a surface broaching tool 26. The surface 25, moreover, is depressed with respect to the ends of the carriage bearing the surfaces 29 and 30 in order properly to position the surface broach with respect to the work support, in Fig. 1 shown supporting a work piece 10 secured by a clamp 11, and to form a shoulder 28 at the upper end of the carriage against which the upper end of the broach 26 abuts when secured by suitable means on the carriage. Thus, all of the longitudinal strain on the tool incident to a cutting stroke is taken by the carriage directly and is not transmitted through the broach attaching means, while the tool is firmly backed throughout its length directly by the carriage. It is to be noted that the cutting stroke of the tool is a down stroke of the carriage 5.

Like the surface 25, each of the surfaces 29 and 30 is formed with a longitudinal groove 31 (see Figs. 1 and 2) for the reception of a key or rib aiding in the securing and aligning of a broaching tool adapting the machine to perform either a push or a pull broaching operation. To set up the machine for a push broaching operation, a push broach 69 is secured in a nose or push-head 67 in turn secured by a bolt and nut 68 in a cross-head 60 attachable by suitable means to the surface 29 (see Fig. 4). The crosshead 60 is formed with a projecting flange 61 which engages the shoulder 28 in order to transmit some of the longitudinal strain on the tool 69 during a cutting stroke directly to the carriage. To accommodate the broaching tool during its stroke, the work support 4 is provided with an aperture 66 over which a work piece 65 is centered. When mounted, the broach 69 is directed downwardly and overlies the carriage 5 so that here again the cutting stroke of the broach is a down stroke of the carriage just as in a surface broaching operation. Moreover, the point of attachment of the broach to the carriage is always rigidly and accurately guided by the ways 20 throughout the stroke of the broach.

To set up the machine for a pull broaching operation as shown in Fig. 3, it is necessary only to substitute a pull broach 64 for the push broach 69 and attach the crosshead 60 to the surface 30. For this type of operation, the push-head 67, by means of which the tool is secured, is replaced by a pull-head 62 retained by a nut 63, and the flange 61 engaged with the lower end edge of the carriage 5. It is to be noted that the carriage 5 is of such length that even in its uppermost position, it extends below the work support 4 thereby enabling the machine to be employed for a pull broaching operation without the necessity of changing the location of the work support. Here again the cutting stroke is a down stroke so that for all types of broaching the operation of the machine is the same and requires no changes whatsoever. All that is required to adapt the machine to any one of the various broaching operations is to attach the appropriate tool.

While a variety of power means may be provided for driving the carriage 5 through its working and return stroke, hydraulic means is employed in the preferred embodiment herein disclosed. Such means comprises generally a hydraulic motor operatively associated with the carriage 5 and composed of a piston 16 and a cylinder 17, a pump 7 for supplying operating fluid to the motor, and a valve 6 for directing and controlling the fluid to obtain the desired cycle of operation. The pump 7, which may be of well known construction, is driven by a motor (not shown) and draws fluid, preferably oil, from a reservoir 8 in the bottom of the column 2. The pump 7 is supported on a cover plate 7' removably secured in a suitable manner over an opening in the rear of the column 2.

To obtain a compact construction, especially a minimum over-all height of the machine, and particularly further to enhance the utility of the machine as a universal broaching machine, the cylinder 17 is here made reciprocable and a part of the carriage 5 while the piston 16 is stationarily mounted in the column 2. Preferably, the carriage and the cylinder are cast integrally (see Fig. 2) so that the cylinder further strengthens and rigidifies the carriage making it even less yieldable to the strains incident to the various broaching operations. The piston 16 is fixed in the column 2 by means of concentric hollow tubes 13 and 14 which also serve as conduits for the supply of fluid to the cylinder. The upper ends of both tubes are secured in a top piece 15 secured over the top of the column 2 while the lower ends are secured in the piston 16 with the inner tube 13 extending through the piston and opening to the end of the cylinder below the piston.

The remainder of the hydraulic system includes, as previously stated, the control valve 6, the pump 7, and the fluid storage reservoir 8. From the reservoir 8, operating fluid is drawn upwardly through an intake pipe 35 into the pump 7 from which it is forced outwardly through a discharge pipe 36 into the hydraulic control valve 6 through a supply port 36' therein. In Fig. 1, hydraulic valve core 53 of the valve 6 is in neutral or intermediate position, so that the fluid may be circulated through it and out a branched return port 37' to a return line 37 and thence back to the reservoir. By a shift of the valve core 53 to its lower or forward position, the fluid is directed outwardly from the valve chamber through a port 38' and thence through a pipe 38 to a passage 39 in the top piece 15 in communication with the inner hollow tube 13 of the stationary piston. The tube 13, as stated, opens into the lower end of the cylinder 17 and when fluid is supplied as thus described it drives the moving cylinder downwardly through a broaching or cutting stroke. By a shift of the valve core 53 to its upper or return position, the fluid is directed outwardly from the valve chamber through a port 40' and thence through a pipe 40 to a passage 41, in the top piece 15, terminating in a recess 41' communicating with the annular passage 42 formed between the hollow tube 14 and the tube 13. Near its lower end, the tube 14 has apertures 43 communicating with the cylinder 17 above the piston 16. The upper end of the cylinder 17 is closed by a cap 44, through which the tube 14 passes with a fluid-tight but slidable fit. The lower end of the cylinder 17 is closed by cap 44'. When fluid is supplied through the pipe 40, the cylinder is driven through an upward or return movement of the carriage. With the valve shifted to its lower or forward position, the fluid in the portion of the cylinder above the piston is returned in well known manner through the tube 14, pipe 40, valve 6 and pipe 37 to the reservoir 8, and when the valve is shifted to its upper or return position, the fluid in the lower end of the cylinder is returned through the tube 13, the pipe 38, and the valve to the reservoir.

Control of the machine is semi-automatic with reversal of the carriage at the end of its forward stroke and arrest of the carriage at the end of its return stroke effected by an automatic shift of the valve 6, while initiation of operation of the machine is effected manually. To that end, a lever 45 is located at the front of the machine on the right hand side so that it can be adjusted by the right hand of an attendant of the machine. The lever is attached by means of a link 46 and rod 47 to an off-set bell crank 48 journaled on a horizontal shaft 48'. At the left end of the bell crank is another link 49 attached by means of a cross arm 49' to one end of a transverse shaft 51 journaled in the frame at 51'. Fixed on the other end of the shaft 51 to rotate with it is a lever 50 having an arm 50' extending rearwardly from the shaft and an arm 50'' extending forwardly. A valve stem 52 is swiveled at its upper end on the end of the arm 50' and extends downwardly and is attached at its lower end to the valve core 53, thus making the valve manually operable by means of lever 45 and placing the valve under the control of the operator at all times. In Fig. 1, the lever and the valve are both shown in neutral position. By shifting the lever toward the machine, that is, rearwardly, the valve is shifted to drive the carriage downwardly. By shifting the lever away from the machine, that is, forwardly, to the "up" position, the valve is shifted to drive the carriage on an up stroke.

To obtain automatic control of the valve to effect reversal and arrest of the carriage, the arm 50'' terminates in a cam 54 disposed in the path of dogs 55 and 56 carried by the cylinder 17. Each of the dogs is mounted in a vertical slot 56' on the cylinder for adjustment upwardly or downwardly as a means for varying the length of the broaching stroke. Engagement of the dog 56 with the end of the arm 50'' at the end of the downward stroke of the carriage serves in well known manner to shift the valve core 53 from its lower or forward position to its upper or return position, thus effecting reversal of carriage movement. Engagement of the dog 55 with the end of the arm 50" at the end of the return movement of the carriage serves in well known manner to shift the valve core 53 from its upper to its intermediate or neutral position, thereby bringing the carriage to rest. The partition 20" divides the hydraulic motor from the remainder of the hydraulic means and is provided with an aperture 20''' through which the arm 50" projects. Access to the valve 6 and parts associated therewith may be had through an opening 2' in the rear wall of the column 2 while access to the dogs 55 and 56 may be had through an opening normally closed by a plate 2''.

The operation of the machine briefly is as follows: Let it be assumed that a work piece has been mounted upon the work support 4, that the appropriate broaching tool has been secured on the carriage 5, and that the parts of the machine are in neutral or rest position, shown particularly in Fig. 1. To initiate operation, the machine attendant would grasp the lever 45 and shift the same rearwardly toward the down position of the lever. This movement through the linkage described moves with the valve core 53 downwardly from its neutral to its forward position. The pump 7 is now connected to discharge operating fluid to the portion of the cylinder below the piston 16, thereby driving the carriage on its downward or broaching stroke. Simultaneously with the shifting of the valve core 53, the lever 50 is tilted from its neutral horizontal position to an inclined position with the cam 54 raised. As the carriage nears the end of its downward stroke, the dog 56 engages the cam 54 and moves it downwardly so as to tilt the lever 50 to the opposite inclination, thereby shifting the valve core 53 from its lower to its upper or return position. In this position, the valve causes a reversal of flow of the operating fluid, with fluid under pressure now supplied to the end of the cylinder above the piston 16, thereby driving the carriage through a return stroke. Such shifting of the valve core 53 is accompanied by a corresponding shift of the lever 45 from its "down" to its "up" position, thereby indicating to the machine attendant the position of the valve and also indicating the movement to be imparted to the lever should it be desirably manually to arrest the operation of the machine. As the carriage appropriates the end of its return stroke, the dog 55 engages the end of the lever 50 and returns the same to its neutral horizontal position, thereby shifting the valve core 53 from its return to its neutral position. With the valve core in neutral position, fluid from the pump 7 is immediately returned to the reservoir 8, thereby bringing the carriage to rest. While the carriage is thus at rest in its upper position, the machine attendant replaces the finished work piece with an unfinished work piece in preparation for the next cycle of operation of the machine.

Should it become necessary or desirable to employ the machine for a different type of broaching operation, the machine is easily and quickly set up for such different broaching operations simply by removing the broaching tool then attached to the carriage and replacing it by a tool of appropriate type. The machine is so designed and constructed that any type of broaching operation may be successfully performed with the work support in the same position and with the cutting stroke of the carriage in the same direction, thereby obviating the necessity of any change in the position of the work support or any rebuilding of the machine to change the direction of the working stroke. The carriage, moreover, is so supported and constructed that a precise operation is performed regardless of the nature of the broaching operation.

Another important advantage of the machine is that it is not limited to a single type of broaching operation but may be employed to perform at the same time a plurality of broaching as well as other operations. By way of example, of the wide range of operations which may be performed and the various set-ups which may be given to the machine, let it be assumed that a work piece requires the broaching of a round hole, the facing of one side of the outer surface of the work piece, and that a bushing is to be pressed into the hole after it is broached. This complicated operation is readily and easily performed on the machine disclosed herein. The work piece would first be mounted in a nest, after which the round pull broach would be inserted and connected to a cross head mounted at the lower end of the carriage. A cross head would also be secured to the top of the carriage and in it would be placed the bushing to be forced into the hole, the bushing being held by a spring plunger. The machine is now adapted to perform the three operations required and upon starting the machine the pull broach would be pulled through the work finishing the round hole, the surface broach would finish the outside surface as required, and after the round pull broach had passed completely through the work, the bushing held by the top cross head would be pressed into place completing the three operations in a single working stroke of the carriage. Upon reversal of the carriage, the work would be lifted out of the nest by the spring plunger and would be removed while the machine is on its return stroke or after it had completed its stroke.

It is believed apparent from the foregoing that I have perfected a universal broaching machine which is readily and quickly adaptable to perform any type of broaching operation as well as miscellaneous other operations and, moreover, is capable of performing a plurality of such various broaching and other operations at the same time. The construction of the machine is such that although it is universal in character it has precision and accuracy of operation equal or superior to that of a single purpose machine. Moreover, the machine is advantageous in that the various types of broaching operation may be performed without a change in the location of the work support, thereby enabling work piece handling mechanism to be permanently attached to the machine. Other features include the minimum over-all height of the machine, the economy of manufacture and the simplicity of operation.

I claim as my invention:

1. A broaching machine comprising, in combination, a base, an upstanding column mounted on the rear of said base, a bed mounted on the front of said base and rising to a height approximately midway of the column, a work support mounted on the bed near the top thereof, vertical guide ways formed on the column extending the full height thereof, a broaching tool carriage slidably mounted in the ways on the column for reciprocation past the work support, said carriage being supported throughout its length and throughout its movement in the ways, the intermediate portion of said carriage being adapted for the attachment of a surface broaching tool, the top portion for the attachment of a push broaching tool and the bottom portion for the attachment of a pull broaching tool, and power means for imparting reciprocatory movement to the carriage.

2. A broaching machine comprising, in combination, an elongated frame, guideways formed on the frame extending longitudinally thereof, a work support mounted on the frame adjacent the guideways and intermediate the ends thereof, an elongated broaching tool carriage slidably mounted on the frame for longitudinal reciprocatory movement past the work support, said carriage being formed with a guide flange extending the full length of each longitudinal side edge for cooperation with said ways whereby said carriage is rigidly supported in said guideways throughout its length and throughout its movements, the intermediate portion of said carriage being adapted for the attachment of a surface broaching tool, one end portion for a push broaching tool and the other end portion for a pull broaching tool, and power means for imparting reciprocatory movement to the carriage.

3. A broaching machine comprising, in combination, an elongated frame, guideways formed on the frame extending longitudinally thereof, a work support mounted on the frame adjacent the guideways, an elongated broaching tool carriage slidably mounted on the frame for reciprocatory movement past the work support, said carriage being formed with a guide flange extending the full length of each longitudinal side edge whereby said carriage is rigidly supported in said guideways throughout its length and throughout its movements, the front face of said carriage being formed with three surfaces for the attachment of a surface, a push or a pull broaching tool, the intermediate one of said surfaces being depressed with respect to the other surfaces to adapt the same for the attachment of a surface broaching tool, and power means for imparting reciprocatory movement to the carriage.

4. A broaching machine comprising, in combination, a base, an upstanding column mounted on the rear of the base, a bed mounted on the front of said base rising to a height approximately midway of the column, a work support mounted on the bed near the top thereof, vertical guideways formed on the front of the column extending the full height thereof, an elongated broaching tool carriage slidably mounted on the column for vertical reciprocatory movement past the work support through a broaching and return stroke, said carriage being disposed with its longitudinal axis vertical and being of a length to extend below the work support when in position at the end of its return movement, a guide flange extending the full length of each vertical side edge of the carriage whereby said carriage is rigidly supported in said guideways throughout its length and throughout its movements, the intermediate portion of said carriage being adapted for the attachment of a surface broaching tool, the top portion for a push broaching tool and the bottom portion for a pull broaching tool, and power means for imparting reciprocatory movement to the carriage.

5. A broaching machine comprising, in combination, a base, an upstanding column mounted on the rear of the base, a bed mounted on the front of said base rising to a height approximately midway of the column, a work support mounted on the bed near the top thereof, guideways formed on the front of the column extending the full height thereof, a broaching tool carriage slidably mounted in the ways on the column for reciprocation relative to the work support, said carriage being supported throughout its length and throughout its movement in the ways, the intermediate portion of the front of said carriage being adapted for the attachment of a surface broaching tool, the top portion of the front of said carriage throughout the movements of the carriage being disposed above said work support and adapted for the attachment of a push broaching tool and the bottom portion of the front of said carriage throughout the movements of the carriage being disposed below said work support and adapted for the attachment of a pull broaching tool, and power means for driving said carriage through a downward broaching stroke and an upward return stroke.

6. A broaching machine comprising, in combination, a frame, an element forming a broaching tool carriage slidably mounted on said frame, a work support secured in the frame, and power means for reciprocating the broaching tool carriage with respect to the work support, said carriage having a first means at one end thereof equipped for the attaching and aligning of a crosshead provided with a push type broach, a second means at the other end thereof similarly equipped for the alternate attaching and aligning of said crosshead provided with a pull type broach, and a third means intermediate said first two means equipped for the attaching and aligning of a fixture provided with a surface broach.

7. A universal broaching machine having, in combination, a frame, a broach carriage slidably guided on the frame, a single work support secured to the frame, and power means for reciprocating the broach carriage, said carriage having a plurality of means thereon including aligning slots and shoulders for the respective and selective attachment of a push, a pull, or a surface broach device for selected broaching operations utilizing the same motion of the broach carriage and the same work support.

8. A broaching machine comprising, in combination, an elongated frame, guideways formed in the frame extending longitudinally thereof, a work support mounted on the frame adjacent the guideways and intermediate the length thereof, a broaching tool carriage slidably mounted in the guideways on said frame for reciprocation relative to the work support, said carriage being supported throughout its length and throughout its movement in said guideways, the intermediate portion of said carriage being adapted for the attachment of a surface broaching tool backed throughout its length by said carriage, a push broaching tool attached at one end of said carriage and extending longitudinally in overlying but spaced relation to said carriage, and power means for imparting reciprocatory movement to said carriage.

9. A broaching machine comprising, in combination, an elongated frame, guideways formed in the frame extending longitudinally thereof, a work support mounted on the frame adjacent the guideways and intermediate the length thereof, a broaching tool carriage slidably mounted in the guideways on said frame for reciprocation relative to the work support, said carriage being supported throughout its length and throughout its movement in said guideways, said carriage having an intermediate and end surfaces adapted for the attachment of broaching tools, the intermediate surface being adapted for the attachment of a surface broaching tool backed throughout its length by said carriage, a crosshead adapted to be attached to either of said end surfaces and supporting a tool of the internal broaching type in overlying but spaced relation to said carriage, and power means for driving said support.

10. A broaching machine comprising, in combination, a base, an upstanding column mounted on the rear of said base, a bed mounted on the front of said base rising to a height approximately midway of the column, a work support mounted on the bed near the top thereof, guideways formed on the column extending the full height thereof, an elongated broaching tool carriage slidably mounted on the column for vertical reciprocatory movement past the work support, said carriage being disposed with its longitudinal axis vertical and being formed with a guide flange extending the full length of each vertical side edge whereby said carriage is rigidly supported in said guideways throughout its length and throughout its movements, the intermediate portion of said carriage being adapted for the attachment of a surface broaching tool, the top portion for a push broaching tool extending downwardly to overlie the carriage, and the bottom portion for a pull broaching tool extending upwardly to overlie the carriage, hydraulic motor means for imparting movement to said carriage comprising a cylinder integral with said carriage and a piston received within said cylinder and fixed on said column, and means for supplying operating fluid to said motor means.

11. A broaching machine comprising, in combination, an elongated frame, guideways formed on the frame extending longitudinally thereof, a work support mounted on the frame adjacent the guideways and intermediate the ends thereof, an elongated broaching tool carriage slidably mounted on the frame for longitudinal reciprocatory movement past the work support, said carriage being formed with a guide flange extending the full length of each longitudinal side edge for cooperation with said ways whereby said carriage is rigidly supported in said guideways throughout its length and throughout its movements, the intermediate portion of said carriage being adapted for the attachment of a surface broaching tool, one end portion for a push broaching tool and the other end portion for a pull broaching tool, hydraulic motor means for imparting movement to said carriage comprising a cylinder integral with said carriage and a piston received within said cylinder and fixed in said frame, and means for supplying operating fluid to said motor means.

12. A broaching machine comprising, in combination, an elongated frame, guideways formed in the frame extending longitudinally thereof, a work support mounted on the frame adjacent the guideways and intermediate the length thereof, an elongated member slidably mounted in the guideways on said frame for reciprocation relative to the work support and supported throughout its length and throughout its movement in said guideways, said member comprising a cylinder disposed longitudinally of said member, and a plurality of means formed on a surface of said member adapted for the aligning and securing thereto of a push, a pull, or a surface broaching tool, a piston fixed in said frame and slidable within said cylinder to form therewith a motor for actuating said member, and means for supplying operating fluid to said motor to drive said member through a broaching and a return stroke relative to the work support.

13. A broaching machine comprising, in combination, an elongated frame, guideways formed in the frame extending longitudinally thereof, a work support mounted on the frame adjacent the guideways and intermediate the length thereof, an elongated broaching tool carriage slidably mounted in the guideways on said frame for reciprocation relative to the work support and supported throughout its length and throughout its movements in said guideways, means formed at the ends of said carriage for the aligning and attaching of push or pull broaching tools, and means formed intermediate its ends for the aligning and attaching of a surface broaching tool, said carriage throughout its reciprocatory movements extending on both sides of said work support whereby a surface, a push or a pull broaching operation may be performed with the broaching stroke of the carriage in the same direction and with the work support in the same position, a cylinder formed integral with said carriage and extending longitudinally the full length thereof, a piston secured in said frame and slidably received within said cylinder to form therewith a hydraulic motor for driving said carriage, and means for supplying operating fluid to said motor.

14. A broaching machine comprising, in combination, an elongated frame, guideways formed in the frame extending longitudinally thereof, a work support mounted on the frame adjacent the guideways and intermediate the length thereof, a broaching tool carriage slidably mounted on the guideways in said frame for reciprocation relative to the work support and supported throughout its length and throughout its movements in said guideways, a plurality of means formed on said carriage for the aligning and attaching respectively of a surface, a push, or a pull broaching tool, a cylinder formed integral with said carriage, a piston fixed in said frame and slidably received within said cylinder to form therewith a hydraulic motor for driving said carriage, a fluid system for supplying operating fluid to the motor comprising a pump and a control valve having a neutral position for cutting off the supply of operating fluid to the cylinder, a forward position for directing fluid to one end of the cylinder to drive the carriage through a broaching stroke and a return position for directing fluid to the opposite end of the cylinder for perfecting a return movement of the carriage, manual means for shifting said valve to initiate a broaching stroke of said carriage, and automatic means operating in timed relation with the movement of said carriage for reversing the carriage at the end of its broaching stroke and arresting the carriage at the end of its return stroke.

15. A broaching machine comprising, in combination, a base, an upstanding column mounted on the rear of said base, a bed mounted on the front of said base and rising to a height approximately midway of the column, a work support mounted on the bed near the top thereof, vertical guide ways formed on the column extending the full height thereof, a broaching tool carriage slidably mounted in the ways on the column for reciprocation past the work support, said carriage being supported throughout its length and throughout its movement in the ways, means at the top of said carriage adapted for the aligning and attaching of a push broaching tool, means at the bottom of said carriage adapted for the aligning and attaching of a pull broaching tool, and means intermediate the top and bottom of the carriage adapted for the aligning and attaching of a surface broaching tool, said tools being selectively attached to perform one type of broaching operation, a cylinder extending longitudinaly of said carriage and cast integrally therewith, a piston slidably received within said cylinder and fixed to the top of said column to form with the cylinder a hydraulic motor for driving said carriage, and hydraulic means for supplying operating fluid to said motor to drive the carriage downwardly through a broaching stroke and upwardly through a return stroke.

16. In a broaching machine having a frame, guideways formed on the frame and a work support, an elongated broaching tool carriage slidably mounted on the frame for reciprocatory movement relative to the work support, said carriage being formed with a guide flange extending the full length of each longitudinal side edge whereby said carriage is rigidly supported in said guideways throughout its length and throughout its movements, the intermediate portion of the front of said carriage having a surface with means formed therein aiding in the aligning and securing of a surface broaching tool, the carriage at its ends extending forwardly beyond the intermediate portion thereof and bearing a surface having means formed therein for aiding in the aligning and securing respectively of a push broaching tool and a pull broaching tool, one extending end of the carriage providing a shoulder against which a surface broaching tool abuts when mounted on the carriage to absorb the longitudinal strain on the tool during a broaching operation.

17. A machine tool comprising, in combination, an elongated frame, guideways formed on the frame extending longitudinally thereof, a work support mounted on the frame adjacent the guideways, an elongated carriage slidably mounted on the frame for reciprocatory movement past the work support, said carriage being supported throughout its length and throughout its movement in said guideways, a plurality of means on said carriage equipped for the selective attaching and alining of a single or a plurality of broaching tools of various types on said carriage, and means for imparting reciprocatory movement to the carriage.

18. A machine tool comprising, in combination, an elongated frame, guideways formed on the frame extending longitudinally thereof, a work support mounted on the frame adjacent the guideways, an elongated carriage slidably mounted on the frame for reciprocatory movement past the work support, said carriage being supported throughout its length and throughout its movement in said guideways and being formed with an intermediate surface and two end surfaces, said intermediate surface being adapted for the attachment of a surface broaching tool and said end surfaces being adapted for the attachment of a crosshead, and means for imparting reciprocatory movement to the carriage.

19. A machine tool comprising, in combination, an elongated frame, guideways formed on the frame extending longitudinally thereof, a work support mounted on the frame adjacent the guideways, an elongated carriage slidably mounted on the frame for reciprocatory movement past the work support, said carriage being supported throughout its length and throughout its movement in said guideways and being formed with an intermediate and end surfaces adapted for the attachment of supporting fixtures, a surface broaching tool attached to the intermediate surface and a crosshead attached to each of said end surfaces, and means for imparting reciprocatory movement to the carriage.

20. A broaching machine having, in combination, a frame, a reciprocating carriage member thereon and means for slidably securing said carriage member to the frame, a bracket member secured to the machine, power means for reciprocating the carriage member with respect to the bracket member, a first means on one of said members for the securing and positioning of an external broaching device and a second means on the same one of said members for the securing and positioning of an internal broaching device, and a work support on the other of said members for rigidly and fixedly holding a work piece during the broaching operation.

21. A broaching machine comprising, in combination, a frame, a work support mounted on said frame intermediate the length thereof, a broaching tool carriage slidably mounted on said frame for reciprocation relative to said work support, means intermediate the ends of said carriage adapted for the attachment of a surface broaching device, means at one end of said carriage adapted for the attachment of a device constructed to receive an internal broaching tool extending longitudinally in overlying but spaced relation to said carriage, and power means for imparting reciprocatory movement to said carriage.

22. A broaching machine comprising, in combination, a frame, a work support mounted on said frame intermediate the length thereof, a broaching tool carriage slidably mounted on said frame for reciprocation relative to the work support, means intermediate the ends of said carriage adapted for the attachment of a device carrying a surface broaching tool, means at one end of said carriage adapted for the attachment of a device carrying a pull broaching tool extending longitudinally in overlying spaced relation to said carriage, and power means for imparting reciprocatory movement to said carriage.

23. A broaching machine comprising, in combination, a frame, a work support mounted on said frame intermediate the length thereof, a broaching tool carriage slidably mounted on said frame for reciprocation relative to the work support, said carriage having means at each end equipped for the attaching and alining of a crosshead, a crosshead for carrying an internal broaching tool adapted to be mounted at either end of said carriage, and power means for imparting reciprocatory movement to said carriage.

FRANCIS J. LAPOINTE.